US009176718B2

(12) United States Patent
Yaffe

(10) Patent No.: US 9,176,718 B2
(45) Date of Patent: Nov. 3, 2015

(54) JAVA PROGRAM FOR EMULATING THE MEMORY MANAGEMENT OF A C PROGRAM AND CORRESPONDING METHOD

(75) Inventor: Lior Yaffe, Hadera (IL)

(73) Assignee: Software AG, Darmstadt (DE)

( * ) Notice: Subject to any disclaimer, the term of this patent is extended or adjusted under 35 U.S.C. 154(b) by 502 days.

(21) Appl. No.: 13/590,629

(22) Filed: Aug. 21, 2012

(65) Prior Publication Data

US 2014/0032205 A1 Jan. 30, 2014

(30) Foreign Application Priority Data

Jul. 27, 2012 (EP) ...................................... 12178282

(51) Int. Cl.
*G06F 9/455* (2006.01)
*G06F 9/45* (2006.01)
*G06F 9/44* (2006.01)

(52) U.S. Cl.
CPC ..... *G06F 8/51* (2013.01); *G06F 8/31* (2013.01)

(58) Field of Classification Search
None
See application file for complete search history.

(56) References Cited

U.S. PATENT DOCUMENTS

| | | | | |
|---|---|---|---|---|
| 6,066,181 A * | 5/2000 | DeMaster | ...................... | 717/148 |
| 6,314,429 B1 | 11/2001 | Simser | | |
| 7,346,897 B2 * | 3/2008 | Vargas | ........................... | 717/137 |

OTHER PUBLICATIONS

Parr, The Relationship between C Structures and Java Classes, Oct. 2003, University of San Francisco pp. 1-3.*
Nagarajan, C for Java Programmers, Feb. 2003, Dept. of Computer Science Cornell University, pp. 1-45.*
Gregory, Byte Buffers and Non-Heap Memory, Apr. 2010, kdgregory.com, pp. 1-17.*
Baldwin, The ByteBuffer Class in Java, Aug. 20, 2002, Develper.com, pp. 1-45.*
Davis, Build your own ObjectPool in Java to boost app speed, Jun. 1, 1998, JAVAWORLD, pp. 1-13.*
Tech Novosoft-us.com, C2j Converter- convert C-code sourse into Java classes, http://tech.novosoft-us.com/product c2j.jsp, retrieved Aug. 14, 2012, 1 page.
Jazilliam: Translating legacy code to natural Java code, http://www.markosweb.com/www/jazillian.com/, retrieved Aug. 14, 2012, 4 pages.
B. Alliet et al., "NestedVM", Binary translation for Java, http://nestedvm.ibex.org/, retrieved Aug. 14, 2012, 2 pages.
S. Malabara et al., "MoHCA-Java*: A Tool for C++ to Java Conversion Support", Department of Computer Science, University of California, Davis, Mar. 8, 1999, 4 pages.
J. Martin et al., "Strategies for Migration from C to Java", Department of Computer Science, University of Victoria, BC, Canada, undated, but at least as early as Aug. 21, 2012, 10 pages.
N. Coffey, The Java equivalent of C/C++ memory management operators: malloc(),http://www.javamex.com/java_equivalents/malloc.shtml, retrieved Aug. 14, 2012, 2 pages.
"C Data types", Wikipedia, http://en.wikipedia.org/wiki/C_data_types, retrieved Aug. 21, 2012, 6 pages.
WebMethods JIS, Modernize large apps in less time, Software AG, www.softwareag.com/de/products/az/jis/, retrieved Aug. 21, 2012, 2 pages.

* cited by examiner

*Primary Examiner* — Omar Fernandez Rivas
*Assistant Examiner* — Bernard E Cothran
(74) *Attorney, Agent, or Firm* — Nixon & Vanderhye, P.C.

(57) ABSTRACT

Certain example embodiments relate to a computer program written in the programming language Java for emulating the memory management of a computer program written in the programming language C. The C program includes instructions for allocating a memory area, instructions for defining at least one data structure, and instructions for defining at least one pointer to the allocated memory area in accordance with the at least one data structure. The Java program may include instructions for: providing a Java byte array for emulating the allocated memory area of the C program; and providing at least one Java object for emulating the at least one data structure of the C program. The at least one Java object uses at least one Java ByteBuffer object for emulating the at least one pointer of the C program.

19 Claims, 1 Drawing Sheet

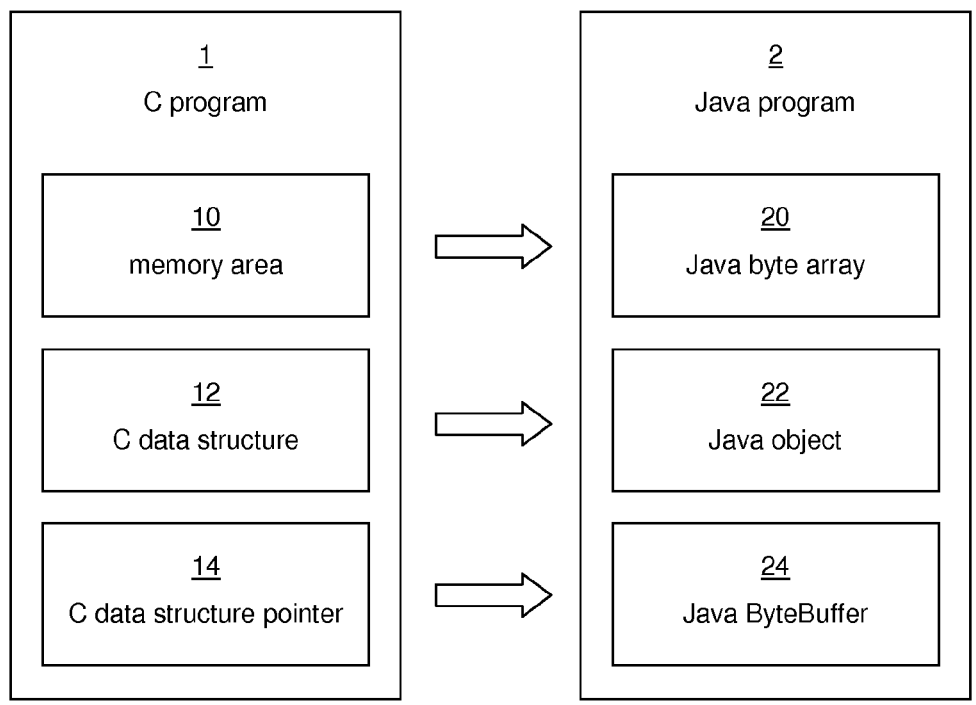

JAVA PROGRAM FOR EMULATING THE MEMORY MANAGEMENT OF A C PROGRAM AND CORRESPONDING METHOD

This application claims priority to EP 12 178 282.5 filed 27 Jul. 2012, the entire contents of which is hereby incorporated by reference.

1. TECHNICAL FIELD

Certain example embodiments relate to a Java program for emulating the memory management of a C program and to a corresponding method.

2. BACKGROUND AND SUMMARY

In the past, computer software was oftentimes programmed in the programming language C. Nowadays, on the other hand, computer software is typically implemented using more modern programming languages, such as Java. Therefore, it is oftentimes desirable to migrate or convert a given C program to Java for the sake of compatibility with modern computing environments.

For example, the product webMethods JIS (Jacada Interface Server) of applicant (cf.www.softwareag.com/de/products/az/jis/) is a so-called Web-enablement solution for integrating legacy computer systems (such as a mainframe) into modern computing environments (such as service-oriented architectures). To this end, webMethods JIS contains code which identifies patterns on a mainframe screen. This complex recursive algorithm has been implemented in the C programming language during the early 90's and was rarely modified ever since. When the JIS Java based server was developed back in 1998, most of the runtime code was rewritten in Java, but the specific code for pattern identification, due to its complexity, remained as a separate DLL/Shared Object which was accessed by the Java environment using the Java Native Interface (JNI). Over the years, the decision not to translate this code to Java caused the following problems for the JIS product:

1. For each modification to the C code, the product had to be recompiled separately for each of the six supported operating systems (Windows, Unix flavours and OS/400) in order for the C code to utilize the operating system specific libraries. This is not necessary for pure Java code which can be compiled once and deployed to any operating system which runs a Java virtual machine.
2. The product could not be packaged as a standalone Java EE EAR file and deployed to an application server since the C DLL/Shared Object could not be loaded from an EAR file To workaround this problem, the product utilized a complex, manual, application server specific, procedure for identifying the location of the C DLL/Shared Object to the application server.
3. It was impossible to run the code using a 64 bit JVM since in order for the Java Native Interface to work, it requires the C code and Java VM to use the same bit model, but the C code was never ported to 64 bit since it relied on pointer size of 4 bytes across the code.

In general, three alternatives were conceivable to solve these problems: One option was to externalize the data type representing a C pointer into a C macro which changes its size between 4 bytes for 32 bit and 8 bytes for 64 bit based on a compiler directive, then scan the code and modify all pointer variables to use this macro. This would still require compilation of the existing C code using both 32 bit and 64 bit compilers on all six supported operating systems. A second option was to use a $3^{rd}$ party tool to perform an automatic translation from C to Java. Lastly, the third option was to re-write the code from scratch in Java.

However, all of these alternatives have more or less severe drawbacks when it comes to the aspect of memory management, because C and Java differ significantly with respect to the management of memory used by the respective computer program. On the one hand, when programming in C, one has direct access to the "raw" physical memory of the computer system which operates the C program. To this end, the programming language C provides functions such as malloc( ) which allow to directly allocate a block/area of raw memory. Pointers can then be used for accessing the allocated memory area via its memory address. In Java, on the other hand, all memory has to be accessed via well-defined objects, so that the actual Java program has no direct possibility to access the physical memory of the underlying computer system. The person skilled in the art will thus appreciate that it is quite difficult to provide a Java program which correctly mimics the behavior of a C program in terms of memory management.

In this context, the US patent application No. 2011/0289490 discloses an automated general purpose C-to-Java programming language translator which, however, does not address the difficult aspect of emulating C memory management in Java. Further, several commercial products exist, such as the C2J converter of Novosoft (cf. http://tech.novosoft-us.com/product_c2j.jsp), Jazillian (cf. http://www.markosweb.com/www/jazillian.com/), and NestedVM (cf. http://nestedvm.ibex.org/). NestedVM creates a virtual machine (VM) for the MIPS (Microprocessor without Interlocked Pipeline Stages) architecture using Java to simulate the C memory model. However, the resulting Java code is not human readable and therefore cannot be maintained, let alone adapted to changed requirements at a later point in time. Furthermore, scientific research has been performed in this field (cf. e.g. S. Malabarba et al.: MoHCA-java: A Tool for C++ to Java Conversion Support, and J. Martin et al.: Strategies for Migration from C to Java), however, without giving particular focus on the memory management discrepancies between C and Java. Lastly, the article "Java equivalents of malloc( ), new, free( ) and delete (ctd)" (cf. http://www.javamex.com/java_equivalents/malloc.shtml) is based on rather simplistic assumptions and individual APIs and does not discuss ways to model complex C data structures in Java.

In summary, it can be said that the prior art predominantly deals with specific details of source to source migration, but not with the difficult topic of representing C memory based data structures simply and efficiently in Java. In particular, when programming a Java program which emulates a given C program, it has to be ensured that the Java program is able to be run on a variety of different platforms, that the Java program code is easily human-readable and thus can be maintained, adapted and extended to changed requirements, and lastly, that the Java program uses the underlying processing resources (in particular the memory of the underlying computer system) in an efficient manner to ensure minimal resource consumption and high performance.

It is therefore the technical problem underlying certain example embodiments to provide an approach for emulating the memory management of a C program in a Java program which is adaptable, cross-platform compatible and/or provides efficient resource consumption and thereby at least partly overcomes the above explained disadvantages of the prior art.

This problem is according to one example aspect solved by a computer program written in the programming language Java (Java program) for emulating the memory management of a computer program written in the programming language C (C program). In the embodiment of claim 1, the C program comprises instructions for allocating a memory area, for defining at least one data structure, and for defining at least one pointer to the allocated memory area in accordance with the at least one data structure and the Java program comprises instructions for:

a. providing a Java byte array for emulating the allocated memory area of the C program;
b. providing at least one Java object for emulating the at least one data structure of the C program;
c. wherein the at least one Java object uses at least one Java ByteBuffer object for emulating the at least one pointer of the C program.

Accordingly, the embodiment defines a Java program which is binary compatible with a given C program, i.e. for any given input, the Java program will produce the exact same binary compatible output as the original C program. More specifically, when the C program defines (a) an allocated memory area, (b) a nested hierarchy of data structures, and (c) a pointer casted to one of the data structures, the equivalent Java program (a) uses a byte array to simulate the allocated memory block, (b) uses standard Java classes to simulate the C nested hierarchy of data structures, and (c) models a C pointer to a memory area using a ByteBuffer object, auch as the java.nio.ByteBuffer. Preferably, when the C program provides functions for iterating, reading and/or writing into the memory area using the data structure pointer, the equivalent Java program uses ByteBuffer backed Java objects to simulate iterating, reading and/writing to the memory area.

It is important to note that since there are various Java Runtime Environments (JVM) for different computing platforms, the example Java program is highly cross-platform compatible, i.e. it can be run on any underlying hardware system for which a corresponding JVM is available. Moreover, since the C data structures are emulated in the Java program by well-defined Java objects (i.e. instances of corresponding Java classes), the resulting Java code is particularly easy to maintain, to adapt and/or extend.

In one aspect of certain example embodiments, the at least one Java object for emulating the at least one data structure of the C program uses bit operations to access the Java byte array, while encapsulating the bit operations for higher-level Java objects. Accordingly, when the at least one Java object is used inside more complex Java objects (as is the case with nested data structures; cf. the examples further below), the Java object which actually accesses the byte array hides the complex bit operations from the higher-level Java objects. This leads to particularly well-structured and easily human-readable code, which can be efficiently maintained, to adapted and/or extended.

In another aspect of certain example embodiments, the at least one data structure of the C program comprises an unsigned C data type and the at least one Java object comprises a corresponding Java data type having an adequate size. As the person skilled in the art will appreciate, Java does not support the unsigned data types available in C. Therefore, when representing a C data structure in Java, the unsigned C data types need to be emulated using a larger Java data type. For example, the unsigned C data type may be a 2 bytes unsigned short C data type and the corresponding Java data type is then a 4 byte Java int. It will, however, be appreciated that the invention is not limited to the specific example of the unsigned short C data type, but is similarly applicable to all unsigned data types available in C (e.g. unsigned char, unsigned short, unsigned int, unsigned long, unsigned long long; cf. Wikipedia "C data types" at http://en.wikipedia.org/wiki/C_data_types for a comprehensive list of the C data types).

In yet another aspect of certain example embodiments, the at least one Java object specifies the endianness of the Java byte array. As the person skilled in the art will appreciate, the term "endianness" generally refers to the ordering of individually addressable sub-components within the representation of a larger data item as stored in memory, wherein "little endian" and "big endian" are known in the art. Java stores information in memory using big endian format, while C uses the endianness of the underlying operating system. Therefore, the Java code may in this aspect specify and thus correctly reflect the endianness of the data used by the corresponding C code.

As a first optimization to the above-described Java programs, the at least one Java ByteBuffer object used for emulating the at least one pointer of the C program is passed as a parameter to the Java class and/or defined as a member variable of the at least one Java object used for emulating the at least one data structure of the C program, and the at least one Java class (and thus also the related object(s)) may provide one or more static methods for accessing the Java ByteBuffer parameter object (such as set and get methods), thereby reducing object creation of the underlying Java class. Accordingly, using static methods and passing the corresponding ByteBuffer as a parameter to the static method instead of creating a Java object with a ByteBuffer member variable leads to Java programs which produce far less objects during runtime. This, in turn, leads to considerable reduced memory consumption and less garbage collection, thereby also increasing the performance of the Java program.

A second way of reducing object creation, which may be employed in addition or alternatively, is that the at least one Java object uses an object pool for re-using Java objects. Accordingly, instead of instantiating a new byte buffer backed object each time it is needed, an already existing object may be used, wherein an object pool is provided for storing such existing objects which are no longer needed and can thus be re-used.

As already explained further above, the Java program of certain example embodiments is preferably binary compatible with the original C program. This means that for any given input the Java program produces the same output as the C program.

Certain example embodiments are further directed to a method for converting a computer program written in the programming language C (C program) into a computer program written in the programming language Java (Java program), wherein the C program comprises instructions for allocating a memory area, instructions for defining at least one data structure, instructions for defining at least one pointer to the allocated memory area in accordance with the at least one data structure, and wherein the method comprises the steps of providing a Java byte array for emulating the allocated memory area of the C program, providing at least one Java object for emulating the at least one data structure of the C program, wherein the at least one Java object uses at least one Java ByteBuffer object for emulating the at least one pointer of the C program. Further advantageous modifications of embodiments of the techniques of certain example embodiments are defined in further dependent claims.

3. SHORT DESCRIPTION OF THE DRAWING

In the following detailed description, presently preferred embodiments of the invention are further described with reference to the following FIGURE:

FIG. 1: A schematic view of a C program and an equivalent Java program in accordance with an embodiment of the invention.

4. DETAILED DESCRIPTION

In the following, a presently preferred embodiment of the invention is described with respect to an exemplary C program 1 and an exemplary Java program 2 as schematically shown in FIG. 1. However, it should be appreciated that the present invention is not limited to C, but may support any 4$^{th}$ generation language (4GL). As can be seen, the exemplary C program 1 defines:

an allocated memory area 10,
a nested hierarchy of data structures (note that only one data structure 12 is exemplarily shown in FIG. 1),
a pointer 14 casted to one of the data structures, and
functions (not shown in FIG. 1) for iterating, reading and/or writing into the memory area using the data structure pointer.

Based on such a C program, it is the basic concept of certain example embodiments to define an equivalent Java program which:

is binary compatible with the C program, i.e. for any given input it will produce the exact same binary compatible output,
uses a byte array to simulate the allocated memory block,
uses standard Java classes to simulate the C nested hierarchy of data structures,
models a C pointer to a memory area using java.nio.ByteBuffer object(s), and
uses ByteBuffer backed Java objects to simulate iterating, reading and/or writing to the memory area.

These and other aspects of embodiments of the present invention will be described below along a simple example:

Exemplary C Program

The exemplary program 1 is written in the programming language C and defines the following data structures 12 "POINT" and "LINE":

```
typedef struct {
    unsigned short x;
    unsigned short y;
} POINT; // Represents a point on a plain
typedef struct {
    POINT start;
    POINT end;
} LINE; // Represents a line connecting its two points
```

As the person skilled in the art will appreciate, the data type "unsigned short" used for variables x and y in the above C data structure POINT occupies two bytes in memory and does not have an equivalent Java data type.

Furthermore, the exemplary C program 1 also defines the following operations (only the signatures are presented below), which serve to calculate the length of a line and to reverse the line direction, respectively:

```
long length(*LINE line); // calculate line length
void reverse(*LINE line); // switch start and end points
```

Further, the following variables are declared in the present example:

```
char *data;
POINT *point
LINE *line
```

Now, a memory area 10 is allocated to the variable "data", and two pointers 14 "point" and "line" are allocated to the memory area 10:

```
data = malloc(SIZE); // SIZE represents an arbitrary size
data = . . . read the data from a memory mapped file . . .
point = (POINT *)data
line = (LINE *)data
```

Each of these pointers 14 may now be used to perform operations on the memory area 10, such as iteration, read and write operations:

```
int pos;
char *mydata;
// Iterate over the memory area bytes
for (pos=0, mydata = data; pos < SIZE; pos++, mydata++) {
    if (*mydata != 0) {
        *mydata ++;
    }
}
/* We can also iterate over the same memory area using the
POINT struct, so that each iteration moves 4 bytes */
for (pos=0, point = (POINT *)data; pos <
SIZE/sizeof(struct POINT); pos++, point++) {
    if (*point.x != 0) {
        *point.x ++;
    }
}
/* We can also iterate over the same memory area using a
LINE struct, so that each iteration moves 8 bytes and the
internal start and end POINT structures map nicely into
their corresponding memory locations based on pointer
offsets */
for (pos=0, line = (LINE *)data; pos < SIZE/sizeof(struct
LINE); pos++, border++) {
    if (*line.start.x != 0) {
        *line.start.x ++;
    }
}
```

Attention is drawn to the following characteristics of the C code shown above:
1. The data, point and line variables used above are all based on the same memory area 1. Therefore each change to one of them is immediately reflected in all others.
2. It is possible to arbitrarily cast pointers 14 of the same memory area 10 to various pointer types 12 and treat each such pointer 14 as a data structure pointer based on the same memory area 10.

Prior Art Approaches for Representing the Exemplary C Program in Java

In order to model the behavior of the above-presented C program 1 in the programming language Java, the person skilled in the art will consider the following two approaches:

One approach is to create a Java class corresponding to each C data structure 12, i.e. create a Java class representing the above POINT data structure 12, and another class representing the above LINE data structure 12. This approach, however, will not work, since in Java each object created from such class files will use its own memory area.

Accordingly, if a LINE object and a POINT object are created based on the same data, these objects will be independent objects. Updating the value of one object will not be reflected in the other object. As long as the underlying memory area is read only, this will work, but there is no way to update the memory area and to reflect the changes in all created objects.

A second approach would be to model the memory area 10 as a Java byte array. This is generally possible, but will create code which is notoriously difficult to understand and therefore hardly adaptable and maintainable. For example, to iterate over a C like LINE struct, one would have to generate the following Java code:

```
@Test
    public void testSimple( ) {
        // Equivalent Java code
        // Iterate over a C LINE struct each iteration moves 8 bytes
        byte[ ] bytes = {0, -1,0,2,0,4,0,6,0,0x1F,0,12, 0,14,0,16};
        for (int pos=0; pos < bytes.length; pos += 8) {
            // *line.start.x != 0
            if (bytes[pos] != 0 || bytes[pos+1] !=0) {
                // *line.start.x ++;
                if (bytes[pos+1] == 0xFF) {
                    // high byte reached
                    if (bytes[pos] == 0xFF) {
                        bytes[pos] = 0;
                        bytes[pos+1] = 0;
                    } else {
                        bytes[pos]++;
                        bytes[pos+1] = 0;
                    }
                } else {
                    bytes[pos+1]++;
                }
            }
        }
        byte[ ] expectedBytes = {0,0,0,2,0,4,0,6,0,0x20,0,12,0,14,0,16};
        Assert.assertTrue(Arrays.equals(expectedBytes, bytes));
    }
```

As the person skilled in the art will appreciate, it is hardly possible to properly maintain such code, let alone to adapt the code to changed requirements at some later point in time (nevertheless, the above code is an example of the code typically generated by conventional C-to-Java translators).

Preferred Embodiment of the Invention

The preferred embodiment of the invention is based on the concept of modeling buffer-based primitive types and then reusing them inside higher-level Java objects.

To this end, all buffer-based objects implement a BufferBasedObject interface, which is defined as follows:

```
public interface BufferBasedObject {
    /**
     * Size in bytes used by this object
     * @return size in bytes
     */
    public int getBytesLength( );
    /**
     * A copy of the underlying buffer used by this object
     * Changes to this copy are not reflected in the object
     * @return copy of the buffer used by the object
     */
    public byte[ ] getBytesView( );
}
```

By implementing the above Java interface, the above-explained unsigned short data type of the programming language C can be modeled as shown in the following BufferBasedUnsignedShort class:

```
public class BufferBasedUnsignedShort implements BufferBasedObject {
    ByteBuffer buffer;
    private final static int BYTE_LENGTH = 2;
    // class construction not listed
    public int get( ) {
        return buffer.getShort(0) & 0xFFFF;
    }
    public void set(int x) {
        buffer.putShort(0, (short)(x & 0xFFFF));
    }
    public int getBytesLength( ) {
        return BYTE_LENGTH;
    }
}
```

The person skilled in the art will note how the C programming language unsigned short data type is modeled using bit operations on the Java int data type inside the get( ) and set( )methods.

Now, it is possible to create a higher-level Point class using two BufferBasedUnsignedShort member variables for holding the Point coordinates:

```
public class Point implements BufferBasedObject {
    BufferBasedUnsignedShort x,y;
    // class construction not listed
    public int getX( ) {
        return x.get( );
    }
    public int getY( ) {
        return y.get( );
    }
    public void setX(int val) {
        x.set(val);
    }
    public void setY(int val) {
        y.set(val);
    }
    public int getBytesLength( ) {
        return x.getBytesLength( ) + y.getBytesLength( );
    }
    public byte[ ] getBytesView( ) {
        byte[ ] bytes = new byte[getBytesLength( )];
        System.arraycopy(x.getBytesView( ), 0, bytes, 0, x.getBytesLength( ));
        System.arraycopy(y.getBytesView( ), 0, bytes, x. getBytesLength( ),
            y.getBytesLength( ));
        return bytes;
    }
}
```

Further, a Line class can be created using two Point member variables for holding the line start and end points and modeling the length calculation:

```
public class Line implements BufferBasedObject {
    Point start;
    Point end;
    // class construction not listed
    public long length( ) {
        return Math.round(Math.sqrt(
            (end.getX( ) - start.getX( )) *
            (end.getX( ) - start.getX( )) +
            (end.getY( ) - start.getY( )) *
            (end.getY( ) - start.getY( ))));
    }
    public void reverse( ) {
```

-continued

```
        Point temp = start;
        start = end;
        end = temp;
    }
    // interface implementation not listed
}
```

It is notable that the above Line class is completely unaware that the Point class used therein is buffer-based.

Given the above-explained Point and Line classes, it is now possible to iterate, read and write to a memory area represented as a Java byte array, using the following Java code. Note that every change made to an object is immediately reflected in the original byte array:

```
    @Test
    public void iterateOverMemoryArea( ) {
        byte[ ] bytes =
    {0,1,0,2,0,4,0,6,0,11,0,12,0,14,0,16};
        int pos = 0;
        while (pos < bytes.length) {
            Line line = new Line(bytes, pos);
            line.reverse( );
            pos += line.getBytesLength( );
        }
        byte[ ] expectedBytes =
    {0,4,0,6,0,1,0,2,0,14,0,16,0,11,0,12};
        Assert.assertTrue(Arrays.equals(expectedBytes,
    bytes));
    }
    @Test
    public void
    changesToPointObjectsAreReflectedInLineObject( ) {
        byte[ ] bytes = {0, 1, 0, 2, 0, 4, 0, 6};
        Point start = new Point(bytes);
        Point end = new Point(bytes,
    start.getBytesLength( ));
        Line line = new Line(bytes, 0);
        Assert.assertEquals(5, line.length( ));
        end.setX(7);
        end.setY(10);
        Assert.assertEquals(10, line.length( ));
    }
```

Characteristics of the Preferred Embodiment of the Invention

ByteBuffer usage—The java.nio.ByteBuffer class was introduced in Java 1.4 as part of the java.nio package. Essentially, it encapsulates a memory area and current pointer and provides convenient methods for reading and writing primitive data types into the backed memory area. Certain example embodiments utilize the ByteBuffer object 24 to create buffer-based objects which mimic the C code ability to map struct into a memory area.

Signed and Unsigned data types—One difference between C and Java is that Java does not support the C unsigned data types. This means that when representing a C data structure using Java, the unsigned C data types needs to be emulated using a larger Java data type. For example, the 2 bytes unsigned short C data type has to be emulated using a 4 byte Java int. This technique is demonstrated by the BufferBasedUnsignedShort class shown further above.

Little endian and Big endian—Java always stores information in memory using the well-known big endian format, while C uses the endianness of the underlying operating system. Therefore, when converting C code to Java, the Java code needs to correctly reflect the endianness of the data used by the C code.

The BufferBasedUnsignedShort class shown further above uses the ByteBuffer order property to represent the endianness of the underlying data. When building a BufferBasedUnsignedShort instance, the code can specify what will be the endianness of the buffer used by this instance using the following code:

```
        BufferBasedUnsignedShort x = new
        BufferBasedUnsignedShort.Builder( ).data(bytes).
        order(ByteOrder.LITTLE_ENDIAN).build( );
```

The default value is ByteOrder.BIG_ENDIAN.

Array backed ByteBuffer vs. direct ByteBuffer—In Java, memory mapped data can be backed by an actual Java byte array 2, or by a direct byte buffer which maps to a memory mapped file, depending on the implementation. Array backed data is obtained when reading a binary resource into a Java byte array, the resulting buffer based object will be backed by an actual Java byte array. A direct ByteBuffer is obtained when using a memory mapped file, e.g. using the method java.nio.channels.FileChannel map( ).

When constructing a BufferBasedUnsignedShort instance, the code can use either a byte array to create an array backed buffer or a byte buffer which enables the usage of a direct buffer, for example:

```
    @Test
    public void getDirectPoint( ) {
        byte[ ] bytes = {-0x01, -0x02, 0x7F, -0x01};
        ByteBuffer directBuffer =
    ByteBuffer.allocateDirect(4);
        directBuffer.put(bytes);
        // The point object is constructed from a byte
    buffer not from a byte array
        Point point = new Point(null, 0, null,
    directBuffer);
        Assert.assertEquals(65534, point.getX( ));
        Assert.assertEquals(32767, point.getY( ));
    }
```

Optimization Techniques

The output of the buffer based Java objects 22 is binary identical to an equivalent C code given the same input. However, the performance of the Java code 2 may be considerably slower and less scalable than the equivalent C code. The main reason is that for a large enough data structure, Java will create a large number of small objects which will consume additional memory and which also need to be garbage collected. In the exemplary code shown above, a single iteration over a data structure of size 8 Mega Bytes will create roughly 1,000,000 Line objects, 2,000,000 Point objects and 4,000,000 BufferBasedUnsignedShort objects. All these objects need to be stored in memory and later garbage collected. This can cause two severe technical problems:

1. Excessive Memory Consumption
2. Slow Performance Due to Excessive Garbage Collection In fact, the inventor found that an implementation such as the one demonstrated above may consume 10 times more memory and run 10 times slower, as compared to an equivalent C code.

In order to improve the performance and to reduce the memory load, the following techniques may thus be employed (which will be explained in more detail below):
1. Using Static Methods to Reduce Object Creation
2. Implementing Object Pooling to Reduce Object Creation
Optimization Technique: Static Methods Using this technique, instead of creating two BufferBasedUnsignedShort objects for each Point object, we make the ByteBuffer a member variable of the Point class, and implement BufferBasedUnsignedShort.get( ) and BufferBasedUnsignedShort.set( ) as static methods passing the ByteBuffer as parameter:

```
public static int get(ByteBuffer buffer) {
    return buffer.getShort(buffer.position( )) & 0xFFFF;
}
public static void set(ByteBuffer buffer, int x) {
    buffer.putShort(buffer.position( ), (short) (x &
0xFFFF));
}
```

The technical advantage of this technique is that it eliminates the creation of two BufferBasedUnsignedShort objects per Point object (since static methods are used) and thus significantly reduces memory consumption and/or garbage collection. On the other hand, the disadvantage is that the higher-level objects ("Point" in our case) need to create and store the low-level ByteBuffer object thus complicating the implementation to some extent.
Optimization Technique: Object Pooling The inventor further found that a simple object pool implementation considerably reduces object creation and/or garbage collection. To this end, each pooled object may implement the Reusable interface:

```
public interface Reusable {
    public Reusable reset( );
}
```

The reset( ) method is responsible for re-initializing the object state to its default state. For example, for BufferBasedUnsignedShort the following code can be implemented:

```
public Reusable reset( ) {
    buffer = null; // forget your existing state
    return this;
}
```

Using this technique, instead of creating two new BufferBasedUnsignedShort objects every time a Point object is created, we instead lookup these objects in the object pool and invoke their reset( ) method in order to restore the objects to their default state. The disadvantage of this technique, on the other hand, is that forgetting to reset a member variable before reusing an object can result in subtle bugs, which are hard to detect.

SUMMARY

Summing up the above, certain example embodiments generally provide an advantageous way of mapping the memory requirements of data structures 12 in the programming language C (and other similar languages) to the programming language Java. The technical advantages of the proposed approach are that the resultant code 2 is easily readable and thus understandable, maintainable and adaptable and this is achieved without significantly compromising performance. It should be noted that although a preferred embodiment of the invention concerns the programming language C as the original program language, the present invention is not limited to C, but is also applicable to other C-like non-Java languages, and more generally to any $4^{th}$ generation programming language (4GL), such as Software AG's Natural memory constructs.

It will be appreciated that the various programs disclosed herein may be stored on any suitable storage medium (transitory or non-transitory), and may be executed in accordance with a suitable computer system that includes processing resources such as, for example, at least one processor and a memory. Such computer systems may be implemented in a networked or other environment. It also will be appreciated that the various objects disclosed herein may be memory resident at some points and, in this regard, may be stored in volatile memory areas or persistent storage areas (e.g., such as, for example, disk). The programs may be self-contained and/or implemented as one or more modules executable by one or more processors in or across one or more computers or computer systems, in different example embodiments.

What is claimed is:

1. A non-transitory computer readable medium tangibly storing a Java computer program written in the Java programming language for emulating the memory management of a C computer program written in the C programming language, wherein the C program comprises:
   instructions for allocating a memory area,
   instructions for defining at least one data structure,
   instructions for defining at least one pointer to the allocated memory area in accordance with the at least one data structure; and
   wherein the Java program comprises instructions for:
   providing a Java byte array for emulating the allocated memory area of the C program;
   providing at least one Java object, different from the Java byte array, for emulating the at least one data structure of the C program;
   wherein the at least one Java object uses at least one Java ByteBuffer object for emulating the at least one pointer of the C program;
   and uses bit operations to access the Java byte array in accordance with the at least one Java object.

2. The computer readable medium of claim 1, wherein said access comprises encapsulating the bit operations for higher-level Java objects.

3. The computer readable medium of claim 1, wherein the at least one data structure of the C program comprises an unsigned C data type and wherein the at least one Java object comprises a corresponding Java data type having an adequate size.

4. The computer readable medium of claim 1, wherein the unsigned C data type is a 2 bytes unsigned short C data type and wherein the corresponding Java data type is a 4 byte Java int.

5. The computer readable medium of claim 1, wherein the at least one Java object specifies the endianness of the Java byte array.

6. The computer readable medium of claim 1, wherein:
   the at least one Java ByteBuffer object is defined as a member variable of the at least one Java object; and
   the at least one Java object provides one or more static methods for accessing the Java ByteBuffer object in order to reduce object creation.

7. The computer readable medium of claim 1, wherein the at least one Java object uses an object pool for re-using Java objects in order to reduce object creation.

8. The computer readable medium of claim 1, wherein for any given input the Java program produces the same output as the C program.

9. The non-transitory computer readable medium according to claim 1, wherein emulating the at least one pointer of the C program includes using the at least one Java ByteBuffer object to emulate use of the pointer to map the at least one data structure to the allocated memory area.

10. The non-transitory computer readable medium according to claim 9, wherein emulating the at least one pointer of the C program includes using the at least one Java ByteBuffer object to access the Java byte array in accordance with a data type of the at least one Java object.

11. The non-transitory computer readable medium according to claim 1, wherein the at least one Java object includes a first Java object and a second Java object, wherein the second Java object is a member of the first Java object and emulates a second data structure which is nested in a first data structure of the C program, and wherein the second Java object includes the at least one Java ByteBuffer object as a member to access the Java byte buffer in accordance with the second Java object.

12. A method for converting a C computer program written in the C programming language into a Java computer program written in the Java programming language Java,
wherein the C program comprises:
instructions for allocating a memory area, instructions for defining at least one data structure,
instructions for defining at least one pointer to the allocated memory area in accordance with the at least one data structure; and
wherein the method comprises:
providing a Java byte array in a memory of a computer system for emulating the allocated memory area of the C program;
providing at least one Java object, different from the Java byte array, for emulating the at least one data structure of the C program;
wherein the at least one Java object uses, in connection with at least one processor, at least one Java ByteBuffer object for emulating the at least one pointer of the C program;
and uses bit operations to access the Java byte array in accordance with the at least one Java object.

13. The method of claim 12, wherein, said access comprises encapsulating the bit operations for higher-level Java objects.

14. The method of claim 12, wherein the at least one data structure of the C program comprises an unsigned C data type and wherein the at least one Java object comprises a corresponding Java data type having an adequate size.

15. The method of claim 14, wherein the unsigned C data type is a 2 bytes unsigned short C data type and wherein the corresponding Java data type is a 4 byte Java int.

16. The method of claim 12, wherein the at least one Java object specifies the endianness of the Java byte array.

17. The method of claim 12, wherein:
the at least one Java ByteBuffer object is defined as a member variable of the at least one Java object; and
the at least one Java object provides one or more static methods for accessing the Java ByteBuffer object in order to reduce object creation.

18. The method of claim 12 wherein the at least one Java object uses an object pool for re-using Java objects in order to reduce object creation.

19. A computer system, including at least one processor and a memory, the computer system being configured to use the at least one process and memory in order to cause a Java computer program written in the Java programming language to emulate the memory management of a C computer program written in the C programming language,
wherein the C program comprises:
instructions for allocating a memory area, instructions for defining at least one data structure,
instructions for defining at least one pointer to the allocated memory area in accordance with the at least one data structure; and
wherein the Java program comprises instructions to:
provide a Java byte array to emulate the allocated memory area of the C program;
provide at least one Java object, different from the Java byte array, to emulate the at least one data structure of the C program;
wherein the at least one Java object uses at least one Java ByteBuffer object for emulating the at least one pointer of the C program;
and uses bit operations to access the Java byte array in accordance with the at least one Java object.

* * * * *